United States Patent [19]

Hashimoto

[11] 3,716,350

[45] Feb. 13, 1973

[54] APPLYING UREA IN THE MOLTEN STATE TO CROPS

[75] Inventor: Saburo Hashimoto, Yorba Linda, Calif.

[73] Assignee: Union Oil Company, Los Angeles, Calif.

[22] Filed: March 3, 1969

[21] Appl. No.: 803,980

[52] U.S. Cl. .................. 71/28, 71/30, 71/64 DB, 260/555 B, 260/555 C
[51] Int. Cl. ................... C05c 9/00, C07c 127/00
[58] Field of Search ............. 71/29, 28, 30, 64 DB; 260/555 B, 555 C

[56] References Cited

UNITED STATES PATENTS

| 1,951,518 | 3/1934 | Meiser et al. | 71/30 X |
| 2,854,482 | 9/1958 | Guyer | 260/555 B |
| 2,916,516 | 12/1959 | Michelitsch | 71/30 X |
| 3,059,280 | 10/1962 | Laehder | 71/64 DB |
| 3,251,879 | 5/1966 | Rosenbloom | 260/555 B |

FOREIGN PATENTS OR APPLICATIONS

| 649,225 | 9/1962 | Canada | 260/555 B |
| 687,489 | 5/1964 | Canada | 260/555 B |
| 959,358 | 6/1964 | Great Britain | 260/555 B |

Primary Examiner—Reuben Friedman
Assistant Examiner—Richard Barnes
Attorney—Milton W. Lee, Richard C. Hartman, Lannas S. Henderson, Dean Sandford, Robert E. Strauss and Michael H. Laird

[57] ABSTRACT

Urea is distributed onto the area to be fertilized by dropping particles of molten urea into the atmosphere 20-500 feet over the area such that the molten urea solidifies into small prills before contacting the area to be fertilized.

7 Claims, No Drawings

APPLYING UREA IN THE MOLTEN STATE TO CROPS

DESCRIPTION OF THE INVENTION

This invention relates to a novel mode of applying urea to crops and forests so as to fertilize the same.

Urea is commonly handled as a solid prill or granule. In conventional prill forming, a substantially anhydrous urea melt is formed and the urea prills are obtained by dropping the molten urea as discrete droplets through a prilling tower countercurrent to a vertical stream of air. The solid urea prills are then bagged and transported in bulk by tank car or tank truck to the distributing location where the urea is to be applied to the soil and/or plants (e.g., citrus trees, forests, pineapple plants, etc.).

The present method of shipping, storing and distributing urea as solid granules or prills is expensive and inefficient. The urea prills are not readily adaptable to efficient application to the soil. As solids they require laborious handling and distribution and cannot be used with the labor saving ground and aerial liquid spraying devices.

The object of my invention, therefore, is an improved method of fertilizing crops, rangelands, and/or forests.

Another object is to facilitate handling and distribution of urea in the application of urea and/or urea-based fertilizers to crops and/or forests.

Other and related objects will be apparent from the following description of the invention.

My invention comprises distributing urea in the molten state to crops and/or forests. In a preferred embodiment, the molten urea is maintained in contact with ammonia to minimize biuret formation. As will be apparent from the following description, the method of my invention substantially facilitates the handling and distribution of urea.

As stated hereinabove, the invention involves shipping, storing and distributing urea in the molten state. Urea may be produced in the conventional manner by reacting ammonia and carbon dioxide under pressure to form ammonium carbamate which is decomposed into urea and water. Ammonia and unconverted ammonium carbamate are flashed from the urea solution. The resulting urea solution is concentrated, preferably mainly by vacuum evaporation to minimize biuret formation, to an essentially anhydrous molten urea (e.g., 97–99 percent urea). This molten urea may be pumped directly, without the commonly practiced intervening steps of crystallization, melting and prilling, into heated tank trucks and/or tank cars for transportation to the fertilization site. At the site, the urea melt can be conveniently pumped from the tank trucks and/or tank cars to a heated storage tank from which the melt can be periodically transferred, as needed, to ground or aerial distribution means. The molten urea may be stored in the elevated ground rig or aircraft in insulated and/or heated tanks having capacities between about 200 gallons and about 7,000 gallons depending on the size of the elevated ground rig or aircraft.

The molten urea can be sprayed from the tanks of the ground rig or aircraft through conventional pressure nozzles and/or rotating nozzles located, for example, on the wings of the aircraft or, for example, attached to a boom supported by a ground rig and the molten urea drops into the atmosphere above the area to be fertilized. The molten urea droplets are crystallized into small solid prills by their contact with the air which cools the droplets and solidifies them into solid particles as they fall upon the crop, rangeland and/or forest. The height or elevation of the discharge nozzles of the ground rig or the elevation at which the aircraft must fly over the crop is a matter of judgement well known to operators skilled in the art and depends upon the particular crop, the area to be covered, relative wind velocity, and size of the prill desired, etc. This height is normally 20–500 feet, and preferably 50–200 feet. The height should be sufficient to permit solidification of the droplets during their fall to the ground. Greater heights can be used without limit; however, the height is preferably no greater than 500 feet, most preferably no greater than 200 feet to minimize drift. The size of the orifices in the nozzles of the aircraft or ground rig is generally between about 0.01 and 2.0 inch and preferably between about 0.5 and 1.5 inch. The size and number of nozzles is a matter of mechanical design and varies with the tank capacity, plane size and speed, urea flow rate, prill size desired, etc.

There are several modifications to the above described method which can be practiced to minimize biuret formation which can occur when the urea is stored for extended time at or above its melting temperature. As is known in the art, biuret ($NH_2CONHCONH_2$) is formed when urea is heated at or above its 132°C. melting point. Solutions of biuret exhibit a phytotoxic effect when applied to plant foliage and for this reason biuret generally is an undesirable ingredient of urea when used as a fertilizer. To avoid such phytotoxicity, the biuret content of foliar sprays is generally kept below 5 percent, preferably below 1 percent, and is limited to as low as 0.25 percent for citrus tree foliar fertilization. Although biuret is not believed to exhibit comparable phytotoxicity in urea melts applied in the manner of this invention, it is preferred to avoid the formation of biuret in quantities in excess of the aforeindicated. The problem of biuret formation can be overcome herein by (1) shipping crystalline urea as solid, unprilled, needle-like crystals and melting the crystalline urea prior to use; (2) adding a melting point depressant to the urea to lower its storage temperature in the molten state; and/or (3) containing the molten urea under ammonia preferably at superatmospheric pressure to thereby inhibit biuret formation.

Method 3 is preferred since the added processing steps of crystallization and subsequent melting of the urea as well as cumbersome handling of solid urea required in Method 1 are disadvantages in this method. The expense and urea contamination from a melting point depressant in Method 2 is likewise a disadvantage. Therefore a preferred modification of the invention comprises maintaining the molten urea under an ammonia atmosphere at superatmospheric pressure in the shipping, storage and/or ground or aerial distribution tanks. The ammonia can be maintained in the shipping, storage and airplane or ground rig distributing tanks at an ammonia pressure of about 50–400 p.s.i.g. preferably 100–250 p.s.i.g. In a preferred modification, the urea in the shipping and storage tanks is maintained under an ammonia pressure over about 100 p.s.i.g., most preferably 200–400 p.s.i.g., while the urea in the tank of the distributing aircraft or ground rig is maintained under a lower ammonia pressure, e.g., a pressure of 50–100 p.s.i.g. The lower pressures of ammonia, e.g., 50–100 p.s.i.g. can usually be achieved by the autogenic ammonia pressure solely from ammonia formed as a by-product of biuret formation. Preferably, however, ammonia is added, even with low pressure storage, to avoid the biuret formation which accompanies even limited amounts of ammonia formation. In still another embodiment, no ammonia is injected in the distribution tanks with an ammonia pressure of 0–50 p.s.i.g., preferably 25–50 p.s.i.g. maintained by venting excess ammonia by-product into the atmosphere. In the low pressure modification, the urea is preferably applied to the crop in 5–50 minutes, most preferably 5–20 minutes, which is prior to the formation of any significant amounts of biuret. Although the high-pressure construction required for maintaining high ammonia pressure does necessitate added expense, the savings in processing, transportation and handling costs by utilization of the method herein more than offsets the added expense.

Method 2 may be combined with Method 3 to minimize the need for high-pressure containing vessels and application equipment. The urea may be shipped in a "wet" form, e.g., containing 5–30 percent and preferably 10–20 percent water. The water lowers the crystallization temperature of the urea to substantially less than the 132°C. melting point of pure urea. To illustrate, urea containing 30 percent water is still liquid at about 50°–60°C. Since biuret formation decreases with decreasing temperature, adding water to a urea melt or, preferably, retaining the water in the urea product indirectly inhibits biuret formation. It is preferred, however, to incorporate less than about 30 percent water in the composition to insure that the urea will solidify when dropped from the aircraft or sprayed from the ground rig into the atmosphere and onto the crop. Other melting point depressants for urea are sodium nitrate and/or potassium nitrate, which, when included in urea at concentrations of from 1 to 35 weight percent form low-melting eutectics. Since these depressants are also plant nutrients they improve the fertilization activity of urea. Preferably, the sodium nitrate and/or potassium nitrate comprise 5–25% of the melt and a particularly useful combination is 15–25% sodium nitrate and 3–10 percent potassium nitrate.

The following examples serve to illustrate modes of practicing the invention.

EXAMPLE 1

Molten anhydrous urea (99 percent purity) is pumped into a 20,000 gallon jumbo tank car having a tank rated at 300 p.s.i.g. and equipped with electric coils to maintain the urea at 135°C. The tank is pressured to 250 p.s.i.g. by injection of ammonia. The urea is transported to the fertilization site where it is pumped from the tank car through insulated lines into an insulated 5,000 barrel storage tank rated at 300 p.s.i.g. and having a pressure-relief valve set at 275 p.s.i.g. Ammonia at 250 p.s.i.g. is maintained in the tank vapor space above the urea. The molten urea is maintained at about 135°C. by electric coils. A 5,000 gallon portion of the stored molten urea is pumped from the storage tank through insulated lines into an insulated, electrically heated tank on a "Martin Mars" airplane typical of those used in forest fire fighting. The aircraft's tank rated at about 50 p.s.i.g., is equipped with a relief valve set at 35 p.s.i.g. The tank has a capacity of 5,500 gallons and is located appropriately in the fuselage so that when filled the load is well balanced. After loading about 5,000 gallons of urea, the "Martin Mars" airplane ascends to a height of about 100 feet above a forest area which is to be fertilized. The anhydrous urea melt is pumped from the 5,500 gallon tank through a manifold system and into two 2-inch headers on the underside of each of the wings. Each header is equipped with seven hollow-cone pressure nozzles of 0.140 inch orifice diameter. The molten urea is thereby broken up into small liquid particles as it is forced through the nozzles and forms small solid prills as the droplets fall through the atmosphere and onto the forest. The total residence time of the urea in the "Martin Mars" tanks is only about 30 minutes such that no significant amount of biuret will form in the urea.

EXAMPLE 2

A liquid urea composition comprising urea and 15 percent water is pumped into a 20,000 gallon jumbo tank car rated at 200 p.s.i.g. which is equipped with electric heating coils. The urea is maintained at about 70°–100°C. and ammonia is injected into the tank to reach a pressure of 120 p.s.i.g. The urea is shipped to its destination and is there transferred to an insulated 20,000 gallon storage tank. The urea is maintained at 70°–100°C. and under 200 p.s.i.g. ammonia pressure in the storage tank. A 5,000 gallon portion is withdrawn from the tank and pumped into the "Martin Mars" airplane of Example 1. The airplane ascends to a height of 200 feet to ensure crystallization of the urea which is sprayed into the atmosphere and falls onto the forest in the manner described in Example 1. The flight is completed in about 40 minutes such that no significant biuret will be formed in the urea.

EXAMPLE 3

This example illustrates the beneficial effect of the presence of ammonia in inhibiting biuret formation. To a bomb was added 100 grams of molten urea containing 1.10 weight percent biuret. The bomb was heated to and maintained at about 150°C. for about 2 hours. The bomb pressure was then measured and found to be about 28 p.s.i.g. The bomb was then heated to and maintained at 150°C. for 40 hours. The pressure reached 80 p.s.i.g. at the end of this period. The bomb was then cooled and the urea was removed. The urea was analyzed and found to contain 7.66 weight percent biuret.

To a bomb were added 100 grams of molten urea containing 1.10 weight percent biuret and 14 grams of ammonia. The bomb was closed and heated to and maintained at 150°C. for 48 hours. The pressure in the bomb was relatively constant at 300 p.s.i.g. throughout the run. The bomb was then evacuated of ammonia, the urea was removed and analyzed to reveal that it contained only 2.20 weight percent biuret.

Examples 1–2 illustrate particular methods of practicing the invention and the invention should not be limited by the process steps described in the examples

I claim:

1. A method of distributing urea to an area to be fertilized comprising transferring urea in the molten state from storage tanks at the fertilization site to a distribution means, maintaining the urea molten in said means and passing the molten urea from said means into the atmosphere 20–500 feet above the area to be fertilized.

2. The method defined in claim 1 wherein the molten urea is shipped or stored under an ammonia pressure of 50–400 p.s.i.g. prior to being transferred to said distribution means.

3. The method defined in claim 2 wherein the urea is stored and transported under an ammonia pressure of 50–400 p.s.i.g. and is maintained under an ammonia pressure of 50–100 p.s.i.g. while contained in said distribution means.

4. The method defined in claim 1 wherein said distribution means is an aircraft.

5. The method defined in claim 1 where the urea has a water content of 5–30 percent.

6. The method defined in claim 1 wherein the molten urea is maintained under an ammonia pressure from 0–50 p.s.i.g. in said distribution means.

7. The method of claim 1 wherein sodium nitrate is added to the molten urea.

* * * * *